United States Patent
Xia et al.

(10) Patent No.: US 10,911,364 B2
(45) Date of Patent: Feb. 2, 2021

(54) PACKET PROCESSING METHOD AND ROUTER

(71) Applicant: HUAWEI TECHNOLOGIES CO., LTD., Shenzhen (CN)

(72) Inventors: Hongmiao Xia, Beijing (CN); Tuanhui Sun, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/264,309

(22) Filed: Jan. 31, 2019

(65) Prior Publication Data

US 2019/0166058 A1 May 30, 2019

Related U.S. Application Data

(63) Continuation of application No. PCT/CN2017/095165, filed on Jul. 31, 2017.

(30) Foreign Application Priority Data

Aug. 4, 2016 (CN) .......................... 2016 1 0633110

(51) Int. Cl.
*H04W 4/00* (2018.01)
*H04L 12/835* (2013.01)
(Continued)

(52) U.S. Cl.
CPC .............. *H04L 47/30* (2013.01); *H04L 45/74* (2013.01); *H04L 47/25* (2013.01); *H04L 47/34* (2013.01);
(Continued)

(58) Field of Classification Search
CPC ......... H04L 45/74; H04L 47/25; H04L 47/30; H04L 47/34; H04L 49/9005;
(Continued)

(56) References Cited

U.S. PATENT DOCUMENTS 7,102,999 B1 * 9/2006 Sindhu ................ H04L 49/3072
370/235
8,804,751 B1 8/2014 Poole et al.
(Continued)

FOREIGN PATENT DOCUMENTS

CN 101252536 A 8/2008
CN 101272345 A 9/2008
(Continued)

OTHER PUBLICATIONS

Office Action dated Jul. 1, 2020, issued in counterpart CN Application No. 201610633110.0, with English translation (20 pages).

*Primary Examiner* — Minh Trang T Nguyen
(74) *Attorney, Agent, or Firm* — Westerman, Hattori, Daniels & Adrian, LLP

(57) ABSTRACT

Embodiments of the application describe a packet processing method and a router. The method includes: receiving, by an input line card, at least one packet; obtaining, by the input line card, information about an available first buffer block in a third buffer module, where the third buffer module is a first buffer module that includes an available first buffer block; allocating, by the input line card, a third buffer block to each of the at least one packet based on at least one buffer information block stored in the input line card and the information about an available first buffer block; and buffering, by the input line card, each packet into the third buffer block. Distributed packet buffering can be implemented by using the method.

16 Claims, 5 Drawing Sheets

(51) Int. Cl.
  *H04L 12/861* (2013.01)
  *H04L 12/883* (2013.01)
  *H04L 12/879* (2013.01)
  *H04L 12/741* (2013.01)
  *H04L 12/825* (2013.01)
  *H04L 12/801* (2013.01)

(52) U.S. Cl.
  CPC ........ *H04L 49/901* (2013.01); *H04L 49/9005* (2013.01); *H04L 49/9015* (2013.01); *H04L 49/9047* (2013.01); *H04L 49/9068* (2013.01)

(58) Field of Classification Search
  CPC ............... H04L 49/901; H04L 49/9015; H04L 49/9047; H04L 49/9068
  See application file for complete search history.

(56) References Cited

U.S. PATENT DOCUMENTS

| | | | | |
|---|---|---|---|---|
| 2005/0018609 | A1* | 1/2005 | Dally | H04L 49/9078 370/235 |
| 2006/0168405 | A1 | 7/2006 | Shoham et al. | |
| 2006/0268709 | A1* | 11/2006 | Singla | H04L 47/50 370/235 |
| 2007/0110087 | A1* | 5/2007 | Abel | H04L 45/62 370/412 |
| 2009/0010162 | A1* | 1/2009 | Bergamasco | H04L 49/90 370/235 |
| 2010/0238941 | A1 | 9/2010 | Matsuo | |
| 2010/0246590 | A1 | 9/2010 | Olesinski et al. | |
| 2012/0106562 | A1* | 5/2012 | Laor | H04L 49/10 370/401 |

FOREIGN PATENT DOCUMENTS

| | | |
|---|---|---|
| CN | 101299721 A | 11/2008 |
| CN | 101304383 A | 11/2008 |
| CN | 101594299 A | 12/2009 |
| CN | 102006226 A | 4/2011 |
| CN | 102739536 A | 10/2012 |
| EP | 2466476 A1 | 6/2012 |

\* cited by examiner

PACKET PROCESSING METHOD AND ROUTER

CROSS-REFERENCE TO RELATED APPLICATIONS

This application is a continuation of International Application No. PCT/CN2017/095165, filed on Jul. 31, 2017, which claims priority to Chinese Patent Application No. 201610633110.0, filed on Aug. 4, 2016. The disclosures of the aforementioned applications are herein incorporated by reference in their entireties.

TECHNICAL FIELD

Embodiments of the application relate to packet processing technologies, and in particular, to a packet processing method and a router.

BACKGROUND

Internet applications have entered into all aspects of the society and exerted huge impact. With emergence of various new applications such as 4K/8K videos, virtual reality (VR)/augmented reality (AR), and telemedicine, Internet traffic continuously increases. In an Internet network, a router is a core device for implementing packet forwarding.

To tolerate a data burst and avoid a packet loss during congestion, a line card of a conventional router usually has a packet buffer. Currently, design specifications of packet buffers of most routers are still guided according to the well-known empirical rule. If a bandwidth of a line card of a router is B, and an end-to-end round trip time (RTT) of a data stream is usually 200 milliseconds, a buffer for by the line card is B*RTT. It may be learned that as traffic increases, an increasingly high requirement is imposed on a router capacity and a bandwidth, and therefore, a buffer requirement of the line card increasingly grows. This becomes one of design bottlenecks of the router. For example, if a line card processing bandwidth is 100 Gbps, and a 2.5 GB buffer is needed, this specification is easily met by using an existing memory technology. If a line card processing bandwidth is 1 Tbps, and a 25 GB buffer is needed, this specification may be met by using an existing memory stacking technology. However, when a future line card processing bandwidth is 10 Tbps, and a 250 GB buffer is needed, it is difficult for a memory technology to meet this requirement in a short term. Therefore, currently, it is urgent to resolve a problem that a line card of a router has an insufficient buffer capacity.

FIG. 1 is a schematic diagram of a router according to the prior art. As shown in FIG. 1, the existing typical router includes an input line card 11, an output line card 12, a switching module 13, and a buffer module 14 connected to the switching module 13. The input line card 11 also includes a buffer module. Based on this, a packet processing process in the prior art is as follows: When the input line card 11 detects that a queue depth of received packets exceeds a preset first waterline, a destination address for a packet in a queue and a subsequent packet entering the queue is changed into an address of the buffer module 14 corresponding to the switching module 13. After the packets are subsequently sent to the buffer module 14, the destination address is changed into an address of the output line card 12. When the input line card 11 detects that the queue depth is lower than a third waterline, and a queue depth corresponding to the buffer module 14 corresponding to the switching module 13 is lower than a second waterline, a destination address for a packet in a queue of the input line card 11 and a subsequent packet entering the queue is changed into the address of the output line card 12, so that the packet of the input line card 11 is directly sent to the output line card 12 by using the switching module 13.

The router provided in the prior art includes one switching module and one buffer module corresponding to the switching module. However, the buffer module may not meet a buffer requirement. Therefore, it is an inevitable trend to extend the buffer module of the router. However, when the router includes a plurality of switching modules, and each switching module corresponds to one buffer module, there is no solution in the prior art for determining a buffer module into which a packet is buffered. Therefore, based on the structure of the router, how to perform distributed packet buffering is a technical problem that needs to be resolved in this application.

SUMMARY

This application provides a packet processing method and a router to effectively implement distributed packet buffering, thereby improving packet processing flexibility.

According to a first aspect, a packet processing method is applied to a router that includes an input line card, an output line card, at least one switching module connecting the input line card and the output line card, and a first buffer module connected to the switching module. The first buffer module includes at least one first buffer block, the input line card includes at least one second buffer module, and each second buffer module includes at least one second buffer block. The method includes:

receiving, by the input line card, at least one packet;

obtaining, by the input line card, information about an available first buffer block in a third buffer module, where the third buffer module is a first buffer module that includes an available first buffer block;

allocating, by the input line card, a third buffer block to each of the at least one packet based on at least one buffer information block stored in the input line card and the information about an available first buffer block, where the third buffer block is a first buffer block or a second buffer block, each buffer information block corresponds to at least one fourth buffer block, each of the at least one fourth buffer block is a first buffer block or a second buffer block, and each buffer information block is used to indicate an occupation status of each fourth buffer block; and buffering, by the input line card, each packet into the third buffer block.

According to the packet processing method, the router can implement distributed packet buffering, where the router may buffer the packet into a first buffer block or a second buffer block. This increases buffering flexibility of the router while a buffer of the router is expanded.

In one embodiment, the allocating, by the input line card, a third buffer block to each of the at least one packet based on at least one buffer information block stored in the input line card and the information about an available first buffer block includes:

determining, by the input line card based on the at least one buffer information block, whether each packet can be stored in a fourth buffer block; and if yes, selecting, by the input line card, a fourth buffer block as the third buffer block, and allocating each packet to the third buffer block; otherwise, establishing, by the input line card, a first buffer information block and using the at least one buffer information block and the first buffer information block as at least one new buffer information block, and allocating, by the input line card, the third buffer block to each packet based on the at least one new buffer information block and the information about an available first buffer block.

According to the method, the third buffer block allocated to each packet can be effectively determined.

In one embodiment, each buffer information block includes a size of occupied space in each fourth buffer block and indication information used to indicate whether each fourth buffer block is a first buffer block, and when the indication information indicates that the fourth buffer block is the first buffer block, each buffer information block further includes an identifier of a first buffer module in which the fourth buffer block is located;

the at least one buffer information block is stored in the input line card in a form of a linked list; and correspondingly, the determining, by the input line card based on the at least one buffer information block, whether each packet can be stored in a fourth buffer block includes:

determining, by the input line card, whether a sum of a size of occupied space in a fifth buffer block and a size of each packet is less than a size of a last buffer block, where the fifth buffer block is a last fourth buffer block corresponding to a last buffer information block in the at least one buffer information block.

According to the method, the input line card may determine whether each packet can be stored in a fourth buffer block.

In one embodiment, the allocating, by the input line card, each packet to the third buffer block includes:

when the input line card determines that the third buffer block is a second buffer block, directly allocating, by the input line card, the third buffer block to each packet; or when the input line card determines that the third buffer block is a first buffer block, sending, by the input line card, an allocation request message to a first switching module corresponding to the third buffer block, where the allocation request message is used to request the first switching module to allocate the third buffer block to each packet;

allocating, by the first switching module, the third buffer block to each packet based on the allocation request message;

sending, by the first switching module, an allocation response message to the input line card, where the allocation response message includes an identifier of the third buffer block; and allocating, by the input line card, each packet to the third buffer block based on the allocation response message.

In one embodiment, the establishing, by the input line card, a first buffer information block includes:

determining, by the input line card, a quantity of fourth buffer blocks that correspond to the at least one buffer information block and each of which is a second buffer block; and if the quantity is less than or equal to a first preset value, establishing, by the input line card, the first buffer information block based on an unoccupied second buffer block; otherwise, establishing, by the input line card, the first buffer information block based on the information about an available first buffer block.

In one embodiment, the information about an available first buffer block includes the identifier of the third buffer module and a quantity of available first buffer blocks included in the third buffer module;

correspondingly, the establishing, by the input line card, the first buffer information block based on the information about an available first buffer block includes:

determining, by the input line card, a second switching module based on the size of each packet, the identifier of the third buffer module, and the quantity of available first buffer blocks included in the third buffer module;

sending, by the input line card, a buffer information block establishment request message to the second switching module, where the buffer information block establishment request message is used to request to obtain the available first buffer block;

allocating, by the second switching module, the available first buffer block to the input line card based on the buffer information block establishment request message;

sending, by the second switching module, a buffer information block establishment response message to the input line card, where the buffer information block establishment response message includes the identifier of the third buffer module; and establishing, by the input line card, the first buffer information block based on the identifier of the third buffer module.

In one embodiment, after the buffering, by the input line card, each packet into the third buffer block, the method further includes:

sending, by the input line card, a packet queue status to the output line card;

determining, by the output line card, a size of a schedulable packet based on the packet queue status, and sending the size of the schedulable packet to the input line card; and scheduling, by the input line card, a packet based on the size of the schedulable packet, in a sequence of the at least one buffer information block, and in a sequence of the at least one fourth buffer block corresponding to each buffer information block.

Because packets are stored in corresponding fourth buffer blocks in a sequence of buffer information blocks, the input line card also performs packet scheduling in the sequence of the buffer information blocks, to ensure reliability of the packet scheduling.

In one embodiment, the method further includes:

when all packets in the at least one fourth buffer block corresponding to each buffer information block are scheduled, releasing, by the input line card, the buffer information block, and when the at least one fourth buffer block includes a first buffer block, sending, by the input line card, a release request message to a fourth buffer module in which the included first buffer block is located; and releasing, by the fourth buffer module, the included first buffer block, and publishing information about an available first buffer block in the fourth buffer module.

The following describes a router according to an embodiment of the present invention. A part of the router corresponds to the foregoing method, and corresponding content achieves a same technical effect. Details are not described herein again.

According to a second aspect, a router includes an input line card, an output line card, at least one switching module connecting the input line card and the output line card, and a first buffer module connected to the switching module, where the first buffer module includes at least one first buffer block, the input line card includes at least one second buffer module, and each second buffer module includes at least one second buffer block; and the input line card is configured to:

receive at least one packet;

obtain information about an available first buffer block in a third buffer module, where the third buffer module is a first buffer module that includes an available first buffer block;

allocate a third buffer block to each of the at least one packet based on at least one buffer information block stored in the input line card and the information about an available first buffer block, where the third buffer block is a first buffer block or a second buffer block, each buffer information block corresponds to at least one fourth buffer block, each of the at least one fourth buffer block is a first buffer block or a second buffer block, and each buffer information block is used to indicate an occupation status of each fourth buffer block; and buffer each packet into the third buffer block.

In one embodiment, the input line card is specifically configured to:

determine, based on the at least one buffer information block, whether each packet can be stored in a fourth buffer block; and if yes, select a fourth buffer block as the third buffer block, and allocate each packet to the third buffer block; otherwise, establish a first buffer information block, use the at least one buffer information block and the first buffer information block as at least one new buffer information block, and allocate the third buffer block to each packet based on the at least one new buffer information block and the information about an available first buffer block.

In one embodiment, each buffer information block includes a size of occupied space in each fourth buffer block and indication information used to indicate whether each fourth buffer block is a first buffer block, and when the indication information indicates that the fourth buffer block is the first buffer block, each buffer information block further includes an identifier of a first buffer module in which the fourth buffer block is located;

the at least one buffer information block is stored in the input line card in a form of a linked list; and correspondingly the input line card is specifically configured to:

determine whether a sum of a size of occupied space in a fifth buffer block and a size of each packet is less than a size of a last buffer block, where the fifth buffer block is a last fourth buffer block corresponding to a last buffer information block in the at least one buffer information block.

In one embodiment, the input line card is specifically configured to:

when determining that the third buffer block is a second buffer block, directly allocate the third buffer block to each packet; or when determining that the third buffer block is a first buffer block, send an allocation request message to a first switching module corresponding to the third buffer block, where the allocation request message is used to request the first switching module to allocate the third buffer block to each packet;

the first switching module is configured to: allocate the third buffer block to each packet based on the allocation request message, and send an allocation response message to the input line card, where the allocation response message includes an identifier of the third buffer block; and the input line card is further configured to allocate each packet to the third buffer block based on the allocation response message.

In one embodiment, the input line card is specifically configured to:

determine a quantity of fourth buffer blocks that correspond to the at least one buffer information block and each of which is a second buffer block; and if the quantity is less than or equal to a first preset value, establish the first buffer information block based on an unoccupied second buffer block; otherwise, establish the first buffer information block based on the information about an available first buffer block.

In one embodiment, the information about an available first buffer block includes the identifier of the third buffer module and a quantity of available first buffer blocks included in the third buffer module;

correspondingly the input line card is specifically configured to:

determine a second switching module based on the size of each packet, the identifier of the third buffer module, and the quantity of available first buffer blocks included in the third buffer module; and send a buffer information block establishment request message to the second switching module, where the buffer information block establishment request message is used to request to obtain the available first buffer block;

the second switching module is configured to: allocate the available first buffer block to the input line card based on the buffer information block establishment request message, and send a buffer information block establishment response message to the input line card, where the buffer information block establishment response message includes the identifier of the third buffer module; and the input line card is further configured to establish the first buffer information block based on the identifier of the third buffer module.

In one embodiment, the input line card is further configured to send a packet queue status to the output line card;

the output line card is configured to: determine a size of a schedulable packet based on the packet queue status, and send the size of the schedulable packet to the input line card; and the input line card is further configured to schedule a packet based on the size of the schedulable packet, in a sequence of the at least one buffer information block, and in a sequence of the at least one fourth buffer block corresponding to each buffer information block.

In one embodiment, when all packets in the at least one fourth buffer block corresponding to each buffer information block are scheduled, the input line card is further configured to release the buffer information block, and when the at least one fourth buffer block includes a first buffer block, the input line card is further configured to send the input line card, a release request message to a fourth buffer module in which the included first buffer block is located; and the fourth buffer module is configured to: release the included first buffer block, and publish information about an available first buffer block in the fourth buffer module.

According to the packet processing method and the router that are provided in this application, the input line card in the router allocates the third buffer block to each of the at least one packet based on the at least one buffer information block stored in the input line card and the information about an available first buffer block. In other words, the input line card determines the third buffer block for each packet, and buffers the packet into the corresponding third buffer block. According to the packet processing method, the router can implement distributed packet buffering, where the router may buffer the packet into a first buffer block or a second buffer block. This increases buffering flexibility of the router while a buffer of the router is expanded.

DESCRIPTION OF EMBODIMENTS

Embodiments of the application are intended to resolve a problem of how to perform distributed packet buffering by providing a packet processing method and a router. The packet processing method includes three aspects: first, buffer block information publishing; second, distributed packet buffering; and third, packet scheduling.

Figure 1:
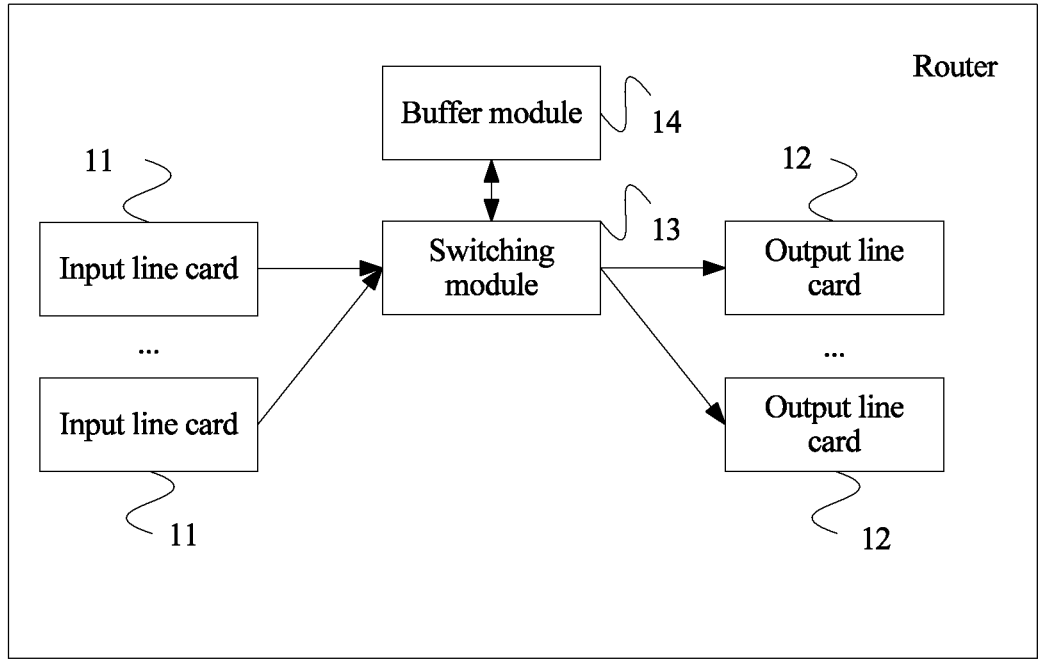
FIG. 1 is a schematic diagram of a router according to the prior art.
Figure 2:
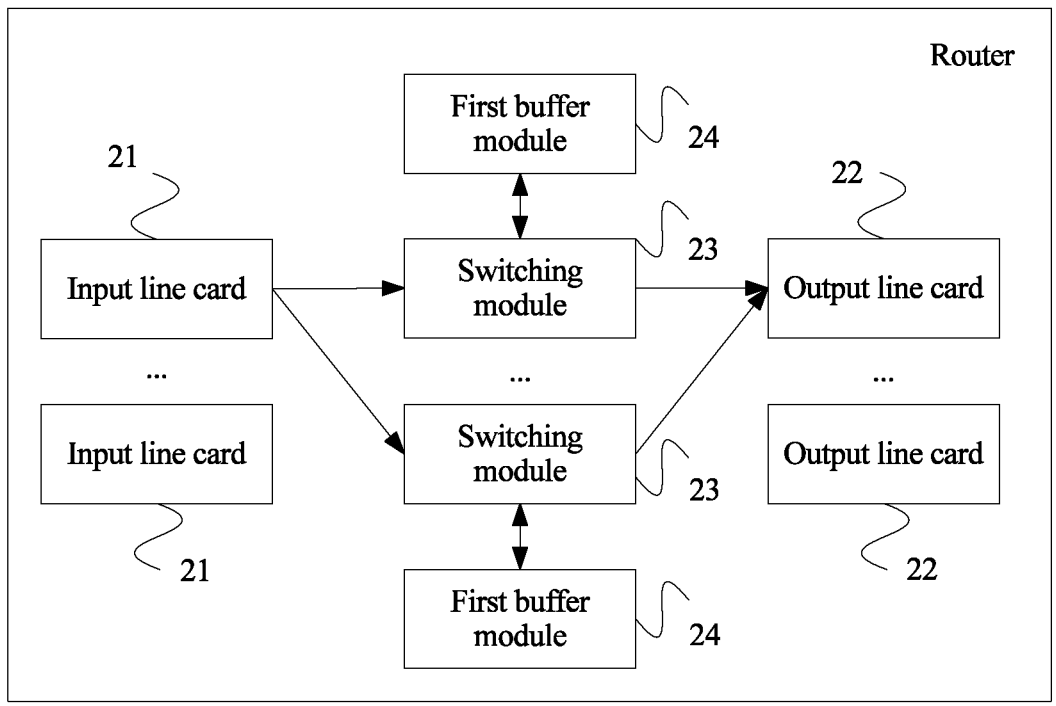
FIG. 2 is a schematic diagram of a router according to an embodiment of this application.

The packet processing method is applied to a router. Specifically, FIG. 2 is a schematic diagram of a router according to an embodiment of this application. As shown in FIG. 2, the router includes an input line card 21, an output line card 22, at least one switching module 23 connecting the input line card 21 and the output line card 22, and a first buffer module 24 connected to the switching module 23. The first buffer module 24 includes at least one first buffer block. The input line card 21 includes at least one second buffer module. Each second buffer module includes at least one second buffer block.

It should be noted that the router includes at least one input line card 21 and at least one output line card 22. Each input line card 21 and each output line card 22 may be connected by using at least one switching module 23. As shown in FIG. 2, one switching module 23 corresponds to one first buffer module 24. Actually, a correspondence between a switching module 23 and a first buffer module 24 is not limited thereto. For example, each switching module 23 may correspond to a plurality of first buffer modules 24.

Figure 3:
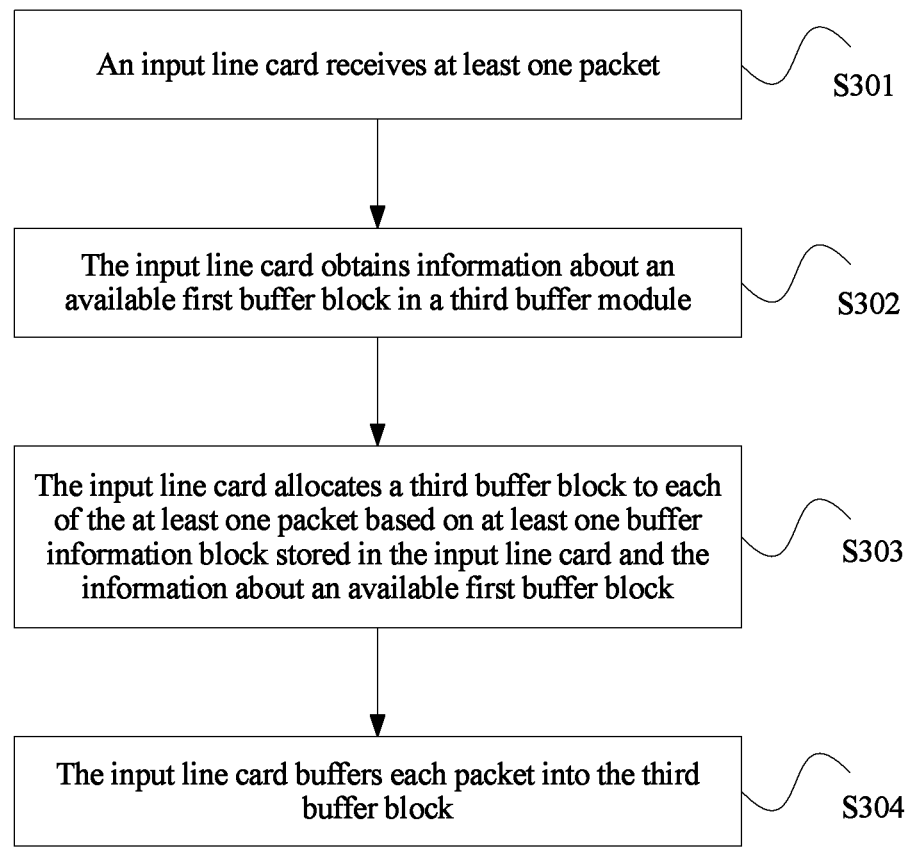
FIG. 3 is a flowchart of a packet processing method according to an embodiment of this application.

Based on the architecture of the router, a packet processing method is provided. In an application scenario of the method, the router receives a packet transmitted by a device, and transmits the packet to another device. FIG. 3 is a flowchart of a packet processing method according to an embodiment of this application. As shown in FIG. 3, the method includes the following operations:

In operation S301: An input line card receives at least one packet.

In operation S302: The input line card obtains information about an available first buffer block in a third buffer module.

The third buffer module is a first buffer module that includes an available first buffer block. In other words, each first buffer module that includes an available first buffer block is referred to as the third buffer module. Further, the input line card obtains the information about an available first buffer block in the third buffer module in two specific manners. In one manner, the third buffer module broadcasts the information about an available first buffer block in the third buffer module. In other words, the input line card passively obtains the information about an available first buffer block in the third buffer module. In the other manner, the input line card sends a request message to all first buffer modules, where the request message is used to request information about an available first buffer block from a third buffer module, and then the input line card receives the information about an available first buffer block that is sent by the third buffer module. In other words, the input line card actively obtains the information about an available first buffer block in the third buffer module. Regardless of the obtaining manner, the third buffer module sends the information about an available first buffer block based on the architecture of the router. For example, when there is only one switching module between the third buffer module and the input line card, the third buffer module sends the information about an available first buffer block to the input line card by using the switching module. When there are a plurality of switching modules between the third buffer module and the input line card, the third buffer module first sends the information about an available first buffer block to a switching module connected to the third buffer module, and then the switching module sends the information about an available first buffer block to the input line card by using another switching module.

In operation S303: The input line card allocates a third buffer block to each of the at least one packet based on at least one buffer information block stored in the input line card and the information about an available first buffer block.

The third buffer block is a first buffer block or a second buffer block. In other words, each first buffer block or second buffer block that has been allocated to a packet is referred to as the third buffer block.

Figure 4A:
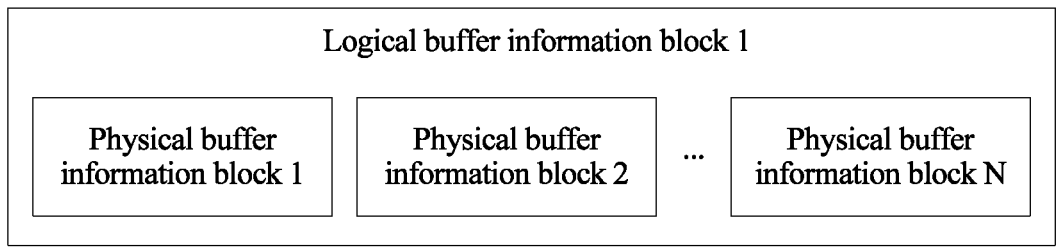
FIG. 4A is a schematic diagram of a logical buffer information block according to an embodiment of this application.
Figure 4B:
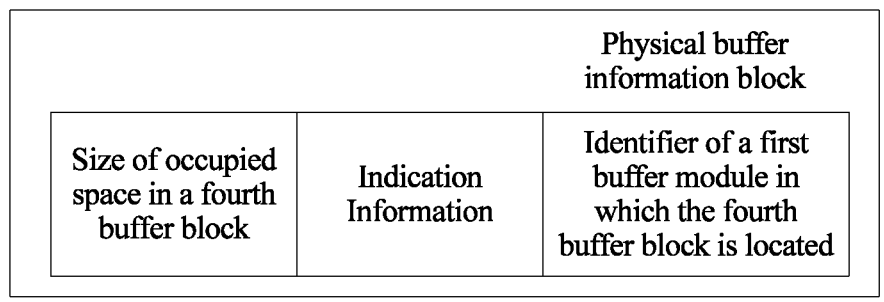
FIG. 4B is a schematic diagram of a physical buffer information block according to an embodiment of this application.

Each buffer information block corresponds to at least one fourth buffer block. In other words, each first buffer block or second buffer block corresponding to a buffer information block is referred to as the fourth buffer block. Each of the at least one fourth buffer block is a first buffer block or a second buffer block, and each buffer information block is used to indicate an occupation status of each fourth buffer block. Specifically, the buffer information block may be classified into a logical buffer information block and a physical buffer information block, and the logical buffer information block is a buffer information block that includes at least one physical buffer information block. FIG. 4A is a schematic diagram of a logical buffer information block according to an embodiment of this application. As shown in FIG. 4A, the logical buffer information block includes N physical buffer information blocks, where N is a positive integer greater than or equal to 1. Each logical buffer information block records a sequence number of a physical buffer information block. FIG. 4B is a schematic diagram of a physical buffer information block according to an embodiment of this application. As shown in FIG. 4B, the physical buffer information block includes a size of occupied space in a fourth buffer block corresponding to the physical buffer information block and indication information used to indicate whether the fourth buffer block is a first buffer block. When the indication information indicates that the fourth buffer block is a first buffer block, the physical buffer information block further includes an identifier of a first buffer module in which the fourth buffer block is located. It should be noted that when the buffer information block is a logical buffer information block, the buffer information block may correspond to at least one fourth buffer block; or when the buffer information block is a physical buffer information block, the buffer information block corresponds to one fourth buffer block.

It may be learned from the foregoing definition of the buffer information block that the input line card allocates the third buffer block to each of the at least one packet based on the at least one buffer information block stored in the input line card and the information about an available first buffer block. In other words, the input line card allocates the third buffer block to each of the at least one packet based on an occupation status of an occupied buffer block and the information about an available first buffer block.

After a corresponding third buffer block is allocated to a packet, information in the at least one buffer information block needs to be updated, and the information about an available first buffer block also needs to be updated. Therefore, when a corresponding third buffer block is to be allocated to a next packet, the input line card allocates the corresponding third buffer block to the packet based on at least one updated buffer information block stored in the input line card and updated information about an available first buffer block.

In operation S304: The input line card buffers each packet into the third buffer block.

In operation S303 and operation S304 describe the second aspect: distributed packet buffering.

In this application, the input line card in the router allocates the third buffer block to each of the at least one packet based on the at least one buffer information block stored in the input line card and the information about an available first buffer block. In other words, the input line card determines the third buffer block for each packet, and buffers the packet into the corresponding third buffer block. According to the packet processing method, the router can implement distributed packet buffering, where the router may buffer the packet into a first buffer block or a second buffer block. This increases buffering flexibility of the router while a buffer of the router is expanded.

Figure 5:
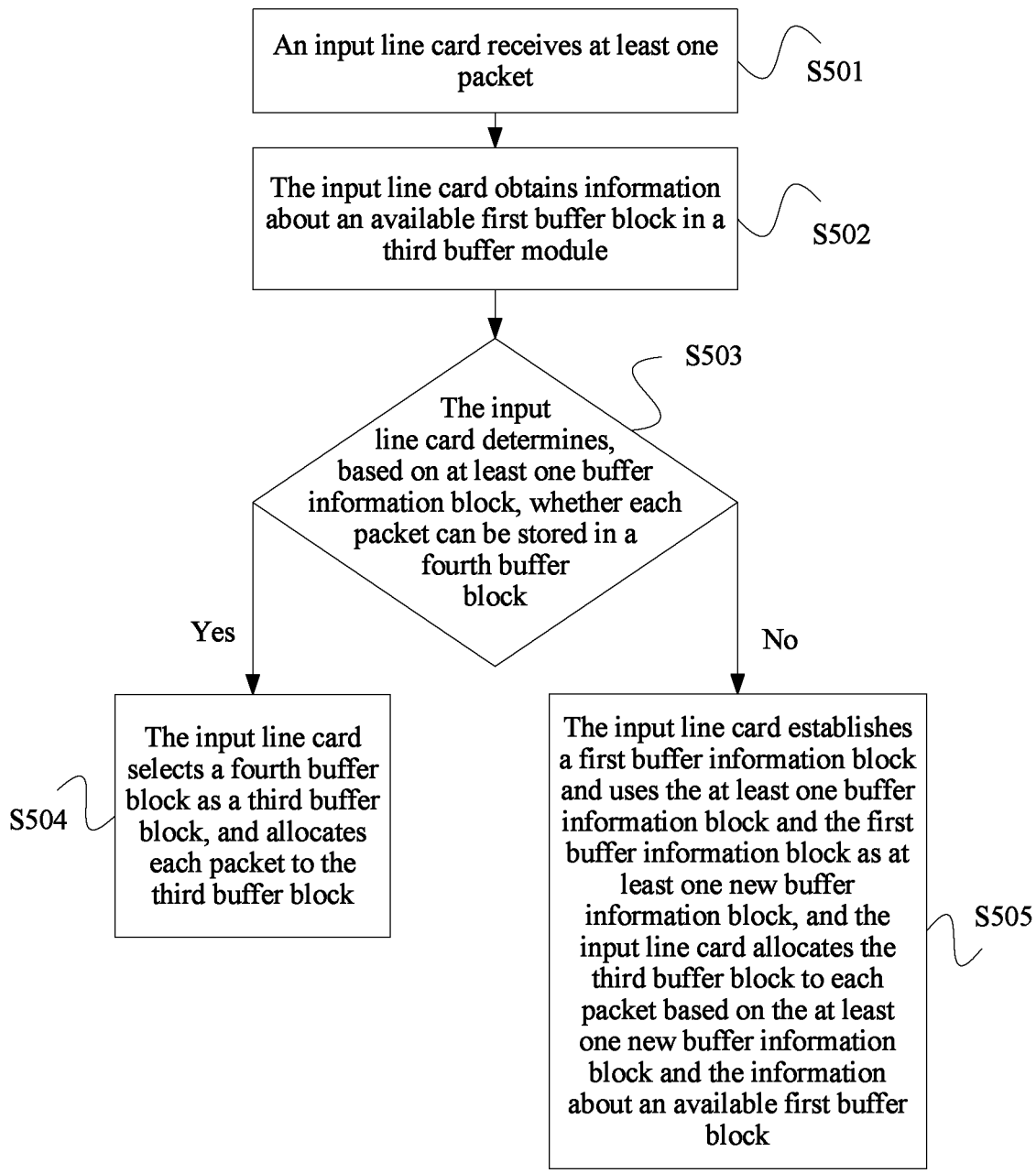
FIG. 5 is a flowchart of a packet processing method according to another embodiment of this application.

Based on the foregoing embodiment, the following further specifies the operations in the foregoing embodiment. Specifically, FIG. 5 is a flowchart of a packet processing method according to another embodiment of this application. As shown in FIG. 5, the method includes the following operations:

In operation S501: An input line card receives at least one packet.

In operation S502: The input line card obtains information about an available first buffer block in a third buffer module.

In operation S501 is the same as step S301, and operation S502 is the same as step S302. Details are not described herein again.

In operation S503: The input line card determines, based on at least one buffer information block, whether each packet can be stored in a fourth buffer block; and if yes, performs operation S504; otherwise, performs operation S505.

Figure 6:
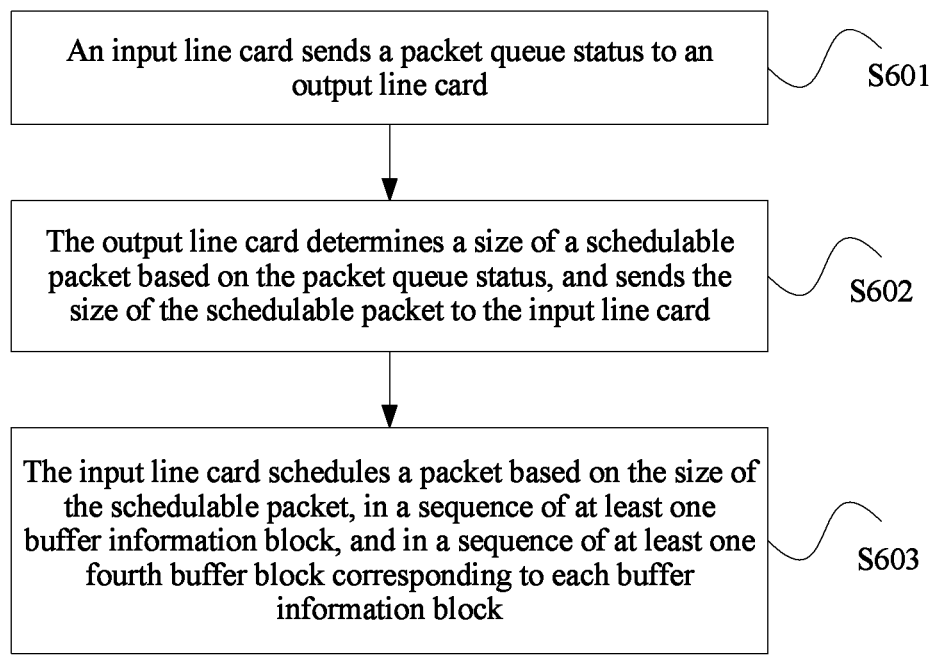
FIG. 6 is a schematic diagram of at least one buffer information block according to an embodiment of this application.

Each buffer information block includes a size of occupied space in each fourth buffer block and indication information used to indicate whether each fourth buffer block is a first buffer block. When the indication information indicates that the fourth buffer block is the first buffer block, each buffer information block further includes an identifier of a first buffer module in which the fourth buffer block is located. The at least one buffer information block is stored in the input line card in a form of a linked list. FIG. 6 is a schematic diagram of at least one buffer information block according to an embodiment of this application. As shown in FIG. 6, three buffer information blocks are shown herein, and each buffer information block may be a logical buffer information block or a physical buffer information block.

The at least one buffer information block is stored in the input line card in the form of the linked list, and packets are stored, in a sequence of buffer information blocks, in fourth buffer blocks corresponding to the buffer information blocks. Therefore, when a fourth buffer block corresponding to a first buffer information block is fully occupied, a packet is stored in a second buffer information block. Based on this, the input line card determines whether a sum of a size of occupied space in a fifth buffer block and a size of each packet is less than a size of a last buffer block. The fifth buffer block is a last fourth buffer block corresponding to a last buffer information block in the at least one buffer information block. When the sum of the size of the occupied space in the fifth buffer block and the size of the packet is less than the size of the last buffer block, it indicates that the packet can be buffered into the fifth buffer block; otherwise, it indicates that space of the fifth buffer block is insufficient.

In operation S504: The input line card selects a fourth buffer block as a third buffer block, and allocates each packet to the third buffer block.

The selected fourth buffer block is the foregoing fifth buffer block, and the fifth buffer block is allocated to the corresponding packet as the third buffer block.

Further, the allocating, by the input line card, each packet to the third buffer block includes:

when the input line card determines that the third buffer block is a second buffer block, directly allocating, by the input line card, the third buffer block to each packet, where in other words, when determining that the third buffer block is a local buffer block in the input line card, the input line card directly allocates the third buffer block to the packet; or when the input line card determines that the third buffer block is a first buffer block, sending, by the input line card, an allocation request message to a first switching module corresponding to the third buffer block, where the allocation request message is used to request the first switching module to allocate the third buffer block to each packet; allocating, by the first switching module, the third buffer block to each packet based on the allocation request message; sending, by the first switching module, an allocation response message to the input line card, where the allocation response message includes an identifier of the third buffer block; and allocating, by the input line card, each packet to the third buffer block based on the allocation response message. In other words, when determining that the third buffer block is a non-local buffer block, the input line card needs to interact with the first switching module corresponding to the third buffer block, to determine the identifier of the third buffer block and allocate the packet to the third buffer block.

In operation S505: The input line card establishes a first buffer information block and uses the at least one buffer information block and the first buffer information block as at least one new buffer information block, and the input line card allocates the third buffer block to each packet based on the at least one new buffer information block and the information about an available first buffer block.

When the input line card determines, based on the at least one buffer information block, that the packet cannot be stored in a fourth buffer block, the input line card needs to establish the first buffer information block. A process of establishing the first buffer information block is as follows: The input line card determines a quantity of fourth buffer blocks that correspond to the at least one buffer information block and each of which is a second buffer block. If the quantity is less than or equal to a first preset value, the input line card establishes the first buffer information block based on an unoccupied second buffer block; otherwise, the input line card establishes the first buffer information block based on the information about an available first buffer block. In other words, the input line card negotiates with a switching module to establish the first buffer information block. Input line cards are independent of each other. Therefore, during negotiation with a switching module, negotiation may occur between a plurality of input line cards and one switching module. Consequently, there may be insufficient resources and a negotiation failure may occur. After the negotiation fails, the switching module sends a negotiation failure message to an input line card that suffers from a negotiation failure, so that the input line card reselects a switching module for negotiation. When a quantity of negotiation failures occurring on a same input line card exceeds a preset value, the input line card needs to discard a packet.

The first buffer information block that has been established based on the unoccupied second buffer block includes: a determined size of occupied space in the second buffer block and indication information used to indicate that the second buffer block is not a first buffer block.

The information about an available first buffer block includes the identifier of the third buffer module and a quantity of available first buffer blocks included in the third buffer module.

Correspondingly a negotiation process in which the input line card establishes the first buffer information block based on the information about an available first buffer block includes: determining, by the input line card, a second switching module based on the size of each packet, the identifier of the third buffer module, and the quantity of available first buffer blocks included in the third buffer module; sending, by the input line card, a buffer information block establishment request message to the second switching module, where the buffer information block establishment request message is used to request to obtain the available first buffer block; allocating, by the second switching module, the available first buffer block to the input line card based on the buffer information block establishment request message; sending, by the second switching module, a buffer information block establishment response message to the input line card, where the buffer information block establishment response message includes the identifier of the third buffer module; and establishing, by the input line card, the first buffer information block based on the identifier of the third buffer module.

In this application, a size of each buffer block is fixed. Based on this, the input line card calculates available space in each third buffer module based on a size of a packet, a quantity of available first buffer blocks in the third buffer module, and the size of the buffer block. When the size of the packet is less than the available space in the third buffer module, the buffer information block establishment request message may be sent to the second switching module corresponding to the third buffer module, and the second switching module allocates the available first buffer block. The first buffer information block established by the input line card based on the identifier of the third buffer module includes a size of occupied space in the available first buffer block, indication information used to indicate the available first buffer block is a first buffer block, and the identifier of the third buffer module.

In this application, how to allocate, by the input line card, the third buffer block to each of the at least one packet based on the at least one buffer information block stored in the input line card and the information about an available first buffer block, and how to allocate the third buffer block to each packet by the input line card are described in detail, so as to implement distributed packet buffering based on the foregoing description.

Based on the foregoing embodiments, the following describes in detail the third aspect: packet scheduling. A packet scheduling method is performed after operation S304, operation S504, or operation S505. Specifically, FIG. 6 is a flowchart of a packet processing method according to still another embodiment of this application. As shown in FIG. 6, the method includes the following procedure:

In operation S601: An input line card sends a packet queue status to an output line card.

The packet queue status includes a size of packets currently included in a packet queue. In one embodiment, the packet queue status further includes a priority of each packet queue and the like.

In operation S602: The output line card determines a size of a schedulable packet based on the packet queue status, and sends the size of the schedulable packet to the input line card.

The output line card determines, based on a configuration of a router, a size of packets that can be transmitted at a time, determines the size of the schedulable packet based on a size of packets currently included in the packet queues, the priorities of the packet queues and the like, and sends the size of the schedulable packet to the input line card.

In operation S603: The input line card schedules a packet based on the size of the schedulable packet, in a sequence of at least one buffer information block, and in a sequence of at least one fourth buffer block corresponding to each buffer information block.

For example, if the input line card determines that the size of the schedulable packet is 500 bytes, the input line card schedules corresponding packets in the sequence of the at least one buffer information block, where a total size of the scheduled packets is less than or equal to 500 bytes.

In one embodiment, when all packets in the at least one fourth buffer block corresponding to each buffer information block are scheduled, the input line card releases the buffer information block, and when the at least one fourth buffer block includes a first buffer block, the input line card sends a release request message to a fourth buffer module in which the included first buffer block is located. The fourth buffer module releases the included first buffer block, and publishes information about an available first buffer block in the fourth buffer module.

In this application, the packet scheduling method is provided. Because packets are stored in corresponding fourth buffer blocks in a sequence of buffer information blocks, the input line card also performs packet scheduling in the sequence of the buffer information blocks, to ensure reliability of the packet scheduling.

This application further provides a router. As shown in FIG. 2, the router includes an input line card 21, an output line card 22, at least one switching module 23 connecting the input line card 21 and the output line card 22, and a first buffer module 24 connected to the switching module 23. The first buffer module 24 includes at least one first buffer block. The input line card 21 includes at least one second buffer module. Each second buffer module includes at least one second buffer block.

The input line card 21 is configured to:

receive at least one packet;

obtain information about an available first buffer block in a third buffer module, where the third buffer module is a first buffer module 24 that includes an available first buffer block;

allocate a third buffer block to each of the at least one packet based on at least one buffer information block stored in the input line card 21 and the information about an available first buffer block, where the third buffer block is a first buffer block or a second buffer block, each buffer information block corresponds to at least one fourth buffer block, each of the at least one fourth buffer block is a first buffer block or a second buffer block, and each buffer information block is used to indicate an occupation status of each fourth buffer block; and buffer each packet into the third buffer block.

The router provided in this embodiment may be used to perform the implementation technical solution of the packet processing method corresponding to FIG. 3. Implementation principles and technical effects thereof are similar, and are not described herein again.

In one embodiment, the input line card 21 is specifically configured to:

determine, based on the at least one buffer information block, whether each packet can be stored in a fourth buffer block; and if yes, select a fourth buffer block as the third buffer block, and allocate each packet to the third buffer block; otherwise, establish a first buffer information block, use the at least one buffer information block and the first buffer information block as at least one new buffer information block, and allocate the third buffer block to each packet based on the at least one new buffer information block and the information about an available first buffer block.

In one embodiment, each buffer information block includes a size of occupied space in each fourth buffer block and indication information used to indicate whether each fourth buffer block is a first buffer block, and when the indication information indicates that the fourth buffer block is the first buffer block, each buffer information block further includes an identifier of a first buffer module 24 in which the fourth buffer block is located;

the at least one buffer information block is stored in the input line card 21 in a form of a linked list; and correspondingly the input line card 21 is specifically configured to:

determine whether a sum of a size of occupied space in a fifth buffer block and a size of each packet is less than a size of a last buffer block, where the fifth buffer block is a last fourth buffer block corresponding to a last buffer information block in the at least one buffer information block.

In one embodiment, the input line card 21 is specifically configured to:

when determining that the third buffer block is a second buffer block, directly allocate the third buffer block to each packet; or when determining that the third buffer block is a first buffer block, send an allocation request message to a first switching module corresponding to the third buffer block, where the allocation request message is used to request the first switching module to allocate the third buffer block to each packet;

the first switching module is configured to: allocate the third buffer block to each packet based on the allocation request message, and send an allocation response message to the input line card 21, where the allocation response message includes an identifier of the third buffer block; and the input line card 21 is further configured to allocate each packet to the third buffer block based on the allocation response message.

In one embodiment, the input line card 21 is specifically configured to:

determine a quantity of fourth buffer blocks that correspond to the at least one buffer information block and each of which is a second buffer block; and if the quantity is less than or equal to a first preset value, establish the first buffer information block based on an unoccupied second buffer block; otherwise, establish the first buffer information block based on the information about an available first buffer block.

In one embodiment, the information about an available first buffer block includes the identifier of the third buffer module and a quantity of available first buffer blocks included in the third buffer module;

correspondingly the input line card 21 is specifically configured to:

determine a second switching module based on the size of each packet, the identifier of the third buffer module, and the quantity of available first buffer blocks included in the third buffer module; and send a buffer information block establishment request message to the second switching module, where the buffer information block establishment request message is used to request to obtain the available first buffer block;

the second switching module is configured to: allocate the available first buffer block to the input line card 21 based on the buffer information block establishment request message, and send a buffer information block establishment response message to the input line card 21, where the buffer information block establishment response message includes the identifier of the third buffer module; and the input line card 21 is further configured to establish the first buffer information block based on the identifier of the third buffer module.

In this application, how to allocate, by the input line card, the third buffer block to each of the at least one packet based on the at least one buffer information block stored in the input line card and the information about an available first buffer block, and how to allocate the third buffer block to each packet by the input line card are described in detail, so as to implement distributed packet buffering based on the foregoing description.

In one embodiment, the input line card 21 is further configured to send a packet queue status to the output line card 22;

the output line card 22 is configured to: determine a size of a schedulable packet based on the packet queue status, and send the size of the schedulable packet to the input line card 21; and the input line card 21 is further configured to schedule a packet based on the size of the schedulable packet, in a sequence of the at least one buffer information block, and in a sequence of the at least one fourth buffer block corresponding to each buffer information block.

In one embodiment, when all packets in the at least one fourth buffer block corresponding to each buffer information block are scheduled, the input line card 21 is further configured to release the buffer information block, and when the at least one fourth buffer block includes a first buffer block, the input line card 21 is further configured to send the input line card, a release request message to a fourth buffer module in which the included first buffer block is located; and the fourth buffer module is configured to: release the included first buffer block, and publish information about an available first buffer block in the fourth buffer module.

In this application, because packets are stored in corresponding fourth buffer blocks in a sequence of buffer information blocks, the input line card of the router also performs packet scheduling in the sequence of the buffer information blocks, to ensure reliability of the packet scheduling.

The foregoing descriptions are merely specific implementations of the present invention, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A packet processing method, comprising:
  receiving, by an input line card in a router, at least one packet, wherein the router further includes an output line card, at least one switching module connecting the input line card and the output line card, and a first buffer module connected to the at least one switching module, the first buffer module including at least one first buffer block, the input line card including at least one second buffer module, and each of the at least one second buffer module including at least one second buffer block;
  obtaining, by the input line card, information about an available first buffer block in a third buffer module, wherein each third buffer module is one of first buffer modules that comprises one of the at least one first buffer block that is available;
  allocating, by the input line card, a third buffer block to each of the at least one packet based on at least one buffer information block stored in the input line card and the information about the available first buffer block, wherein each third buffer block is one of the at least one first buffer block and the at least one second buffer block, each of the at least one buffer information block corresponds to at least one fourth buffer block, each of the at least one fourth buffer block is one of the at least one first buffer block and the at least one second buffer block, and each of the at least one buffer information block is used to indicate an occupation status of each of the at least one fourth buffer block; and
  buffering, by the input line card, each of the at least one packet into the third buffer block.

2. The method according to claim 1, wherein the allocating, by the input line card, the third buffer block to each of the at least one packet based on the at least one buffer information block stored in the input line card and the information about the available first buffer block comprises:
  determining, by the input line card based on the at least one buffer information block, whether each of the at least one packet can be stored in the at least one fourth buffer block; and
  if yes, selecting, by the input line card, one of the at least one fourth buffer block as the third buffer block, and allocating each of the at least one packet to the third buffer block;
  otherwise, establishing, by the input line card, a first buffer information block and using the at least one buffer information block and the first buffer information block as at least one new buffer information block, and allocating, by the input line card, the third buffer block to each of the at least one packet based on the at least one new buffer information block and the information about the available first buffer block.

3. The method according to claim 2,
  wherein each of the at least one buffer information block comprises a size of occupied space in each of the at least one fourth buffer block and indication information used to indicate whether each of the at least one fourth buffer block is one of the at least one first buffer block; and
  wherein when the indication information indicates that the at least one fourth buffer block is one of the at least one first buffer block, each buffer information block further comprises an identifier of the first buffer module in which the at least one fourth buffer block is located;
  wherein the at least one buffer information block is stored in the input line card in a form of a linked list; and
  wherein the determining, by the input line card based on the at least one buffer information block, whether each of the at least one packet can be stored in the fourth buffer block comprises:
    determining, by the input line card, whether a sum of a size of occupied space in a fifth buffer block and a size of each of the at least one packet is less than a size of a last buffer block,
    wherein the fifth buffer block is a last fourth buffer block corresponding to a last buffer information block in the at least one buffer information block.

4. The method according to claim 2, wherein the allocating, by the input line card, each of the at least one packet to the third buffer block comprises:
  performing, by the input line card, an operation based on whether the third buffer block is one of the at least one second buffer block or one of the at least one first buffer block, including,
    in response to the input line card determining that the third buffer block is one of the at least one second buffer block, directly allocating the third buffer block to each of the at least one packet; and
    in response to the input line card determining that the third buffer block is one of the at least one first buffer block, sending an allocation request message to a first switching module corresponding to the third buffer block, wherein the allocation request message is used to request the first switching module to allocate the third buffer block to each of the at least one packet;
  allocating, by the first switching module, the third buffer block to each of the at least one packet based on the allocation request message;
  sending, by the first switching module, an allocation response message to the input line card, wherein the allocation response message comprises an identifier of the third buffer block; and
  allocating, by the input line card, each of the at least one packet to the third buffer block based on the allocation response message.

5. The method according to claim 2, wherein the establishing, by the input line card, the first buffer information block comprises:
  determining, by the input line card, a number of fourth buffer blocks that correspond to the at least one buffer information block and each of which is one of the at least one second buffer block; and
  if the number is less than or equal to a first preset value, establishing, by the input line card, the first buffer information block based on an unoccupied second buffer block;

otherwise, establishing, by the input line card, the first buffer information block based on the information about the available first buffer block.

6. The method according to claim 5, wherein the information about the available first buffer block comprises the identifier of the third buffer module and the number of available first buffer blocks comprised in the third buffer module; and wherein the establishing, by the input line card, the first buffer information block based on the information about the available first buffer block comprises:
determining, by the input line card, a second switching module based on the size of each of the at least one packet, the identifier of the third buffer module, and the number of available first buffer blocks comprised in the third buffer module;
sending, by the input line card, a buffer information block establishment request message to the second switching module, wherein the buffer information block establishment request message is used to obtain the available first buffer block;
allocating, by the second switching module, the available first buffer block to the input line card based on the buffer information block establishment request message;
sending, by the second switching module, a buffer information block establishment response message to the input line card, wherein the buffer information block establishment response message comprises the identifier of the third buffer module; and
establishing, by the input line card, the first buffer information block based on the identifier of the third buffer module.

7. The method according to claim 1, wherein the method further comprises:
buffering, by the input line card, each of the at least one packet into the third buffer block;
in response to the buffering, performing the following operations:
sending, by the input line card, a packet queue status to the output line card;
determining, by the output line card, a size of a schedulable packet based on the packet queue status, and sending the size of the schedulable packet to the input line card; and
scheduling, by the input line card, a packet based on the size of the schedulable packet, in a sequence of the at least one buffer information block, and in a sequence of the at least one fourth buffer block corresponding to each buffer information block.

8. The method according to claim 1, further comprising:
when packets in the at least one fourth buffer block corresponding to each buffer information block are scheduled, releasing, by the input line card, the buffer information block;
when the at least one fourth buffer block comprises a first buffer block, sending, by the input line card, a release request message to a fourth buffer module in which the comprised first buffer block is located; and
releasing, by the fourth buffer module, the comprised first buffer block, and publishing information about the available first buffer block in the fourth buffer module.

9. A router, comprising an input line card, an output line card, at least one switching module connecting the input line card and the output line card, and a first buffer module connected to the switching module, wherein the first buffer module comprises at least one first buffer block, the input line card comprises at least one second buffer module, and each of the at least one second buffer module comprises at least one second buffer block; and wherein the input line card is configured to:
receive at least one packet;
obtain information about an available first buffer block in a third buffer module, wherein the third buffer module is one of first buffer modules that comprises one of the at least one first buffer block that is available;
allocate a third buffer block to each of the at least one packet based on at least one buffer information block stored in the input line card and the information about the available first buffer block, wherein the third buffer block is one of the at least one first buffer block and the at least one second buffer block, each of the at least one buffer information block corresponds to at least one fourth buffer block, each of the at least one fourth buffer block is one of the at least one first buffer block and the at least one second buffer block, and each of the at least one buffer information block is used to indicate an occupation status of each of the at least one fourth buffer block; and
buffer each of the at least one packet into the third buffer block.

10. The router according to claim 9, wherein the input line card is configured to:
determine, based on the at least one buffer information block, whether each of the at least one packet can be stored in the at least fourth buffer block; and
if yes, select one of the at least fourth buffer block as the third buffer block, and allocate each of the at least one packet to the third buffer block;
otherwise, establish a first buffer information block, use the at least one buffer information block and the first buffer information block as at least one new buffer information block, and allocate the third buffer block to each of the at least one packet based on the at least one new buffer information block and the information about the available first buffer block.

11. The router according to claim 10, wherein each of the buffer information blocks comprises a size of occupied space in each of the at least one fourth buffer block and indication information used to indicate whether each of the at least one fourth buffer block is one of the at least one first buffer block; and
wherein when the indication information indicates that each of the at least one fourth buffer block is one of the at least one first buffer block, each buffer information block further comprises an identifier of a first buffer module in which the at least one fourth buffer block is located;
wherein the at least one buffer information block is stored in the input line card in a form of a linked list; and
wherein the input line card is configured to:
determine whether a sum of a size of occupied space in a fifth buffer block and a size of each of the at least one packet is less than a size of a last buffer block, wherein the fifth buffer block is a last fourth buffer block corresponding to a last buffer information block in the at least one buffer information block.

12. The router according to claim 10, wherein the input line card is configured to:
perform, by the input line card, an operation based on whether the third buffer block is one of the at least one second buffer block or one of the at least one first buffer block, wherein the input line card directly allocates the third buffer block to each of the at least one packet in response to determining that the third buffer block is one of the at least one second buffer block, and sends an allocation request message to a first switching module corresponding to the third buffer block in response to determining that the third buffer block is one of the at least one first buffer block, wherein the allocation request message is used to request the first switching module to allocate the third buffer block to each of the at least one packet;

wherein the first switching module is configured to: allocate the third buffer block to each of the at least one packet based on the allocation request message, and send an allocation response message to the input line card, wherein the allocation response message comprises an identifier of the third buffer block; and wherein the input line card is further configured to allocate each of the at least one packet to the third buffer block based on the allocation response message.

13. The router according to claim 10, wherein the input line card is configured to:

determine a number of fourth buffer blocks that correspond to the at least one buffer information block and each of which is one of the at least one second buffer block; and if the number is less than or equal to a first preset value, establish the first buffer information block based on an unoccupied second buffer block;

otherwise, establish the first buffer information block based on the information about the available first buffer block.

14. The router according to claim 13, wherein the information about the available first buffer block comprises the identifier of the third buffer module and the number of available first buffer blocks comprised in the third buffer module;

wherein the input line card is configured to:

determine a second switching module based on the size of each of the at least one packet, the identifier of the third buffer module, and the number of available first buffer blocks comprised in the third buffer module; and send a buffer information block establishment request message to the second switching module, wherein the buffer information block establishment request message is used to obtain the available first buffer block;

wherein the second switching module is configured to: allocate the available first buffer block to the input line card based on the buffer information block establishment request message, and send a buffer information block establishment response message to the input line card, wherein the buffer information block establishment response message comprises the identifier of the third buffer module; and wherein the input line card is further configured to establish the first buffer information block based on the identifier of the third buffer module.

15. The router according to claim 9, wherein the input line card is configured to send a packet queue status to the output line card;

wherein the output line card is further configured to: determine a size of a schedulable packet based on the packet queue status, and send the size of the schedulable packet to the input line card; and wherein the input line card is further configured to schedule a packet based on the size of the schedulable packet, in a sequence of the at least one buffer information block, and in a sequence of the at least one fourth buffer block corresponding to each buffer information block.

16. The router according to claim 9, wherein when packets in the at least one fourth buffer block corresponding to each buffer information block are scheduled, the input line card is further configured to release the buffer information block;

wherein when the at least one fourth buffer block comprises a first buffer block, the input line card is further configured to send the input line card, a release request message to a fourth buffer module in which the comprised first buffer block is located; and wherein the fourth buffer module is configured to: release the comprised first buffer block, and publish information about the available first buffer block in the fourth buffer module.

* * * * *